(12) United States Patent
Ito et al.

(10) Patent No.: US 7,771,639 B2
(45) Date of Patent: Aug. 10, 2010

(54) POLYMER FILM PRODUCING APPARATUS AND METHOD (75) Inventors: Koju Ito, Kanagawa (JP); Satoshi Sakamaki, Kanagawa (JP); Nobuyoshi Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 365 days.

(21) Appl. No.: 11/727,817

(22) Filed: Mar. 28, 2007

(65) Prior Publication Data

US 2007/0231492 A1 Oct. 4, 2007

(30) Foreign Application Priority Data

Mar. 28, 2006 (JP) ............... 2006-088200

(51) Int. Cl.
*B29D 7/00* (2006.01)
*B28B 1/14* (2006.01)

(52) U.S. Cl. .................. 264/216; 264/310; 264/319

(58) Field of Classification Search .............. 264/212, 264/216, 217, 1.34, 1.6, 204, 207, 208, 211.13, 264/211.18, 211.2, 299, 310, 319
See application file for complete search history.

(56) References Cited

U.S. PATENT DOCUMENTS

| 2004/0212112 | A1* | 10/2004 | Tsujimoto | 264/1.34 |
| 2008/0099954 | A1* | 5/2008 | Ito et al. | 264/217 |
| 2009/0081518 | A1* | 3/2009 | Miyachi et al. | 429/33 |
| 2009/0108487 | A1* | 4/2009 | Suzuki et al. | 264/171.1 |
| 2009/0135344 | A1* | 5/2009 | Suzuki et al. | 349/96 |

FOREIGN PATENT DOCUMENTS

| JP | 01055214 A | * | 3/1989 |
| JP | 11-123732 A | | 5/1999 |
| JP | 2003103544 A | * | 4/2003 |
| JP | 2004-314527 A | | 11/2004 |
| WO | WO 2006101220 A1 | * | 9/2006 |
| WO | WO 2006106895 A1 | * | 10/2006 |
| WO | WO 2007007825 A1 | * | 1/2007 |
| WO | WO 2007024028 A1 | * | 3/2007 |

OTHER PUBLICATIONS

JIII Journal of Technical Disclosure, 2001-1745 (Mar. 15, 2001), p. 28 cited lines.

* cited by examiner

*Primary Examiner*—Joseph S Del Sole
*Assistant Examiner*—Ryan Ochylski
(74) *Attorney, Agent, or Firm*—Sughrue Mion, PLLC (57) ABSTRACT A polymer film producing apparatus has a moving support on which dope containing polymer and solvent is cast to form a cast film. The cast film is stripped from the support to obtain a polymer film containing the solvent, and the polymer film is dried. A first gas flow duct has gas nozzles for causing a first dry gas to flow toward the cast film. A second gas flow duct has a gas outlet disposed downstream from the gas nozzles, and positioned higher than a height of the gas nozzles relative to the support, for causing a second dry gas to flow toward the cast film in a moving direction of the support. Furthermore, the first gas flow duct includes a gas blow wall for defining the first flow path by opposing to the support. The gas blow wall has the gas nozzles.

7 Claims, 3 Drawing Sheets

POLYMER FILM PRODUCING APPARATUS AND METHOD

BACKGROUND OF THE INVENTION

1. Field of the Invention

The present invention relates to a polymer film producing apparatus and method. More particularly, the present invention relates to a polymer film producing apparatus and method in which a film surface of polymer film can be highly smooth to ensure flatness of the polymer film as product.

2. Description Related to the Prior Art

Cellulose acylates are used as a support of polymer film contained in photosensitive materials, such as photographic films, owing to advantageous characteristics, for example rigidity, non-flammability, and the like. A typical example of cellulose acylate is cellulose triacetate (TAC) having an average acetylation degree of 58.0-62.5%. Also, the polymer film of the cellulose triacetate (TAC) is used as a protection film of a polarizing element, or an optical compensation film (view angle enlarging film or the like), any of those being incorporated in a liquid crystal display (LCD) panel. This is effective because of optically utilizing the highly isotropic property of the polymer film.

A solution casting is a widely used method of producing polymer film of the cellulose triacetate (TAC) with high quality suitable for optical use. A solution casting of producing polymer film of cellulose triacetate (TAC) is typically suggested in JIII Journal of Technical Disclosure Monthly (Japan Hatsumei Kyokai, Kokai Giho), No. 2001-1745. At first, cellulose triacetate (TAC) is dissolved in a mixed solvent of which a main component is dichloromethane, methyl acetate or the like, to prepare dope or polymer solution. After this, the dope is cast on a support by a casting die, to form cast film. When the cast film dries to have a self-supporting property, a self-supporting cast film is stripped by a stripping roller. The cast film is dried, and wound as a roll of the polymer film.

To encourage drying of the cast film in the solution casting method, a dry gas flow is applied to a surface of the cast film. If application of the dry gas flow is unsuitable, it is likely to lower the surface quality of the cast film. JP-A 11-123732 discloses a suggested solution of this problem. In production of the polymer film by use of the dope or solution containing 300 wt. % or more of the solvent as a solvent content, the surface of the cast film is dried to lower the solvent content of the cast film at a level of 300 wt. % or less in drying per one minute, to increase flatness of the surface.

The cast film has an initial region from a first position of start of casting where the dope or solution from the casting die contacts the casting support to a second position of application of the dry gas flow. It is likely in the cast film that a surface is roughened by an unwanted gas flow created naturally in the initial region. Irregularity of a streak shape or patterned line shape may occur. To solve the problem, JP-A 2004-314527 discloses a gas flow regulating panel for covering the cast film in a region which is downstream from the casting die within 1,000 mm, to suppress influence of the unwanted gas flow on the surface of the cast film.

There are problems in the methods of JP-A 11-123732 and 2004-314527. Drying of the cast film according to JP-A 11-123732 is controlled at a low speed, so the productivity of the polymer film is low. As the gas flow regulating panel is suggested in JP-A 2004-314527, a gas flow will occur in a region of the gas flow regulating panel even with the gas flow regulating panel, because there is a relative speed of gas according to the run of the casting support. Attempts to keep high quality of the surface of the cast film are unsuccessful in the known techniques.

SUMMARY OF THE INVENTION

In view of the foregoing problems, an object of the present invention is to provide a polymer film producing apparatus and method in which a film surface of polymer film can be highly smooth to ensure flatness of the polymer film as product.

In order to achieve the above and other objects and advantages of this invention, a polymer film producing apparatus has a moving support on which dope containing polymer and solvent is cast to form a cast film, wherein the cast film is stripped from the support to obtain a polymer film containing the solvent, and the polymer film is dried. The polymer film producing apparatus includes a first gas flow device, having a first gas outlet for causing a first dry gas to flow toward the cast film. A second gas flow device has a second gas outlet disposed downstream from the first gas outlet, and positioned higher than a height of the first gas outlet relative to the support, for causing a second dry gas to flow in a moving direction of the support.

Furthermore, a first flow path is disposed to extend in the moving direction, for flowing of the first dry gas from the first gas flow device on the cast film. A second flow path is disposed to extend downstream from the first flow path with respect to the moving direction, for flowing of the second dry gas from the second gas flow device on the cast film. A height H1 of the first flow path relative to the support is equal to or more than 20 mm and equal to or less than 300 mm.

A length La of the first flow path is smaller than a length Lb of the second flow path.

Furthermore, a flow regulator is disposed at an upper end of the second gas outlet, for directing the second dry gas in the moving direction.

The first gas flow device further comprises a vent channel, formed near to the first gas outlet, for passage of the first dry gas, and for causing the first dry gas to flow in the moving direction near to the cast film.

Each of $\alpha 1$ and $\alpha 2$ is equal to or more than 20 and equal to or less than 150, where $\alpha 1$ and $\alpha 2$ satisfy conditions of:

$$\alpha 1 = V1/(H1^{1/2})$$

$$\alpha 2 = V2/(H2^{1/2})$$

where V1 is a flow rate (m/sec) of the first dry gas;

V2 is a flow rate (m/sec) of the second dry gas;

H2 is a height of the second flow path with reference to the support.

Time of lapse after a start of contact of the dope on the support until supply of the first dry gas to the cast film is 15 seconds or less.

Upon or before lapse of 15 seconds after a start of forming the cast film, the first gas flow device starts operation and supplies the first dry gas to the cast film for at least three seconds.

Temperature of the first and second dry gases is equal to or more than 40 deg. C. and equal to or less than 150 deg. C.

Furthermore, a flow regulator is disposed between the first and second gas flow devices, for directing the first dry gas in the moving direction.

The first gas outlet is constituted by plural gas nozzles.

The first gas flow device includes a gas blow wall for defining the first flow path by opposing to the support, the gas blow wall having the first gas outlet. The second gas flow device includes a middle wall for constituting one inner edge of the second gas outlet. An upper wall is disposed higher than the middle wall, opposed to the middle wall, for defining the second gas outlet, and for further extending downstream, to define the second flow path by opposing to the support.

Also, a polymer film producing method is provided, in which dope containing polymer and solvent is cast on a moving support to form a cast film, the cast film is stripped from the support to obtain a polymer film containing the solvent, and the polymer film is dried. The polymer film producing method includes causing a first dry gas to flow toward the cast film through a first gas outlet positioned to face the support. A second dry gas is caused to flow through a second gas outlet being open in a moving direction of the support and positioned higher than a height of a first flow path of a flow of the first dry gas relative to the support.

In the flow of the first dry gas, an outer layer portion of the cast film is dried, to form a surface layer on a surface of the cast film with a higher surface tension than an undried portion. In the flow of the second dry gas, drying of the cast film is promoted.

A second flow path is disposed to extend downstream from the first flow path with respect to the moving direction, for flowing of the second dry gas on the cast film. A length La of the first flow path is smaller than a length Lb of the second flow path.

Consequently, film surface of polymer film can be highly smooth to ensure flatness of the polymer film as product.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

[Raw Material]

Polymers in the invention can be any of various polymeric materials usable in solution casting. A typical example of cellulose ester is cellulose acylate having an average acetylation degree of 58.0-62.5%. A preferable example of cellulose acylate is cellulose triacetate (TAC). Preferable examples of cellulose acylates satisfy all of the conditions I-III as follows:

$$2.5 \leq A+B \leq 3.0 \qquad \text{I}$$

$$0 \leq A \leq 3.0 \qquad \text{II}$$

$$0 \leq B \leq 2.9 \qquad \text{III}$$

where A and B represent a degree of substitution of an acyl group (—CO—R) formed by substituting hydroxy groups in cellulose. A represents a degree of substitution of an acetyl group (—CO—CH$_3$) formed by substituting hydroxy groups in cellulose. B represents a total degree of substitution of acyl groups having 3-22 carbon atoms. Preferably, TAC should include 90 wt. % or more of particles of 0.1-4 mm.

The cellulose is constructed by glucose units making a beta-1,4 bond, and each glucose unit has a liberated hydroxy group at second, third and sixth positions. Cellulose acylate is a polymer in which part or whole of the hydroxy groups are esterified so that the hydrogen is substituted by acyl groups having two or more carbon atoms. The degree of substitution for the acyl groups in cellulose acylate is a degree of esterification at second, third or sixth position in cellulose. Accordingly, when 100% of the hydroxy group at the same position is substituted, the degree of substitution at this position is 1.

The total degree of substitution DS2+DS3+DS6 for the acyl groups at the second, third or sixth positions is in the range of 2.00-3.00, preferably 2.22-2.90, and in particular preferably 2.40-2.88. The signs DS2, DS3 and DS6 are degrees of substitution for the acyl groups at respectively the second, third or sixth positions in hydroxy groups in the glucose unit. Further, a ratio DS6/(DS2+DS3+DS6) is preferably 0.28 or more, and particularly 0.30 or more, and especially in the range of 0.31-0.34.

An acyl group of only one example may be contained in the cellulose acylate of the invention. However, cellulose acylate may contain acyl groups of two or more examples. If two or more acyl groups are contained, one of the plural acyl groups should be preferably an acetyl group. Let DSA be a total degree of substitution for the acetyl groups. Let DSB be a total degree of substitution for other acyl groups at the second, third or sixth positions than the acetyl groups. The value DSA+DSB is preferably in the range of 2.22-2.90, and particularly in the range of 2.40-2.88. Further, the DSB is preferably at least 0.30, and especially at least 0.70. Furthermore, in the DSB, the percentage of a substituent at the sixth position is preferably at least 20%, particularly at least 25%, especially at least 30% and most especially at least 33%. Further, the value DSA+DSB at sixth position is at least 0.75, particularly at least 0.80, and especially 0.85. Cellulose acylate satisfying the above conditions can be used to prepare a solution (or dope) having a preferable solubility. Especially when chlorine-free type organic solvent is used, the adequate dope can be prepared. Also, the dope can be prepared so as to have a low viscosity, and the suitability for filtration becomes higher.

Cellulose to produce cellulose acylates can be obtained any one of linter cotton and pulp cotton, but preferably can be obtained from linter cotton.

Examples of acyl groups in cellulose acylates having two or more carbon atoms can be aliphatic groups, aryl groups, and the like. For example, cellulose acylates may be alkyl carbonyl esters, alkenyl carbonyl esters, aromatic carbonyl esters, aromatic alkenyl carbonyl esters, and the like of cellulose, and can further contain a substitution group. Preferable examples of groups include: propionyl, butanoyl, pentanoyl, hexanoyl, octanoyl, decanoyl, dodecanoyl, tridecanoyl, tetradecanoyl, hexadecanoyl, octadecanoyl, isobutanoyl, tert-butanoyl, cyclohexane carbonyl, oleoyl, benzoyl, naphthyl carbonyl, and cinnamoyl. Among those, particularly preferable groups are propionyl, butanoyl, dodecanoyl, octadecanoyl, tert-butanoyl, oleoyl, benzoyl, naphthyl carbonyl, and cinnamoyl. Further, specifically preferable groups are propionyl and butanoyl.

Examples of solvents for preparing the dope include:

aromatic hydrocarbons, such as benzene and toluene;

halogenated hydrocarbons, such as dichloromethane and chlorobenzene;

alcohols, such as methanol, ethanol, n-propanol, n-butanol, and diethylene glycol;

ketones, such as acetone and methyl ethyl ketone;

esters, such as methyl acetate, ethyl acetate, and propyl acetate;

ethers, such as tetrahydrofuran and methyl cellosolve.

Note that the term of dope is used herein to mean a solution or dispersion of polymer in a solvent, the composition being obtained by dissolving or dispersing.

Preferable halogenated hydrocarbons for use contain 1-7 carbon atoms. Among those, dichloromethane is desirable. It is preferable in a mixed solvent to mix one or more alcohols containing 1-5 carbon atoms with the dichloromethane, for the purpose of high solubility, easy separability from a support for casting, mechanical strength of film material, various optical characteristics of a cellulose ester. Such alcohols are contained in the mixed solvent preferably in a range of 2-25 wt. %, and desirably in a range of 5-20 wt. %. Preferable examples of alcohols are methanol, ethanol, n-propanol, isopropanol, n-butanol and the like. Among those, specifically preferable substances are methanol, ethanol, n-butanol, and mixture of two or more of them.

Solvents not containing dichloromethane are effectively used in the publicly suggested manner, for the purpose of minimizing influence to environment. Examples of compounds useful to this end are ethers having 4-12 carbon atoms, ketones having 3-12 carbon atoms, esters having 3-12 carbon atoms, and alcohols having 1-12 carbon atoms. Two or more compounds can be mixed as mixed solvents. Specifically preferable mixed solvents are mixtures of at least two of methyl acetate, acetone, ethanol and n-butanol. Ethers, ketones, esters and alcohols of the examples may have a cyclic structure. Compounds having two or more functional groups of —O—, —CO—, —COO— and —OH, namely groups of ethers, ketones, esters and alcohols, can be used as a solvent.

Details of cellulose acylates are according to various relevant techniques suggested in JP-A 2005-104148. Those examples and their various features can be used in the present invention. Uses of various materials in relation to those have been suggested in JP-A 2005-104148, including solvents, plasticizers, degradation retardants, ultraviolet (UV) absorbers, optical anisotropy control agents, retardation control agents, dyes, matte agents, release agents, stripping accelerators, and other additives.

I. Specific Examples of Cellulose Acylates

Suggested in JP A 57-182737 (corresponding to U.S. Pat. No. 4,499,043), JP A 10-45803 (corresponding to U.S. Pat. No. 5,856,468), JP A 11-269304 (corresponding to U.S. Pat. No. 6,139,785), JP A 8-231761, JP A 10-60170, JP A 9-40792, JP A 11-5851, JP A 9-90101, JP A 4-277530, JP A 11-292989, JP A 2000-131524, and JP A 2000-137115.

II. Specific Examples of Solvents for Esters and their Dissolution

Suggested in JP A 10-324774, JP A 8-152514, JP A 10-330538, JP A 9-95538 (corresponding to U.S. Pat. No. 5,663,310), JP A 9-95557 (corresponding to U.S. Pat. No. 5,705,632), JP A 10-235664 (corresponding to U.S. Pat. No. 6,036,913), JP A 2000-63534, JP A 11-21379, JP A 10-182853, JP A 10-278056, JP A 10-279702, JP A 10-323853 (corresponding to U.S. Pat. No. 6,036,913), JP A 10-237186, JP A 11-60807, JP A 11-152342, JP A 11-292988, JP A 11-60752, JP A 2000-95876, and JP A 2000-95877.

III. Plasticizers

Suggested in JP A 4-227941, JP A 5-194788, JP A 60-250053, JP A 6-16869, JP A 5-271471, JP A 7-286068, JP A 5-5047 (corresponding to U.S. Pat. No. 5,279,659), JP A 11-80381, JP A 7-20317, JP A 8-57879, JP A 10-152568, and JP A 10-120824.

IV. Degradation Retardants and UV Absorbers

Suggested in JP A 60-235852, JP A 3-199201, JP A 5-190707, JP A 5-194789, JP A 5-197073, JP A 5-271471, JP A 6-107854, JP A 6-118233, JP A 6-148430, JP A 7-11055, JP A 7-11056, JP A 8-29619, JP A 8-239509 (corresponding to U.S. Pat. No. 5,806,834), JP A 2000-204173, and JP A 2000-193821.

[Production of Dope]

Figure 1:
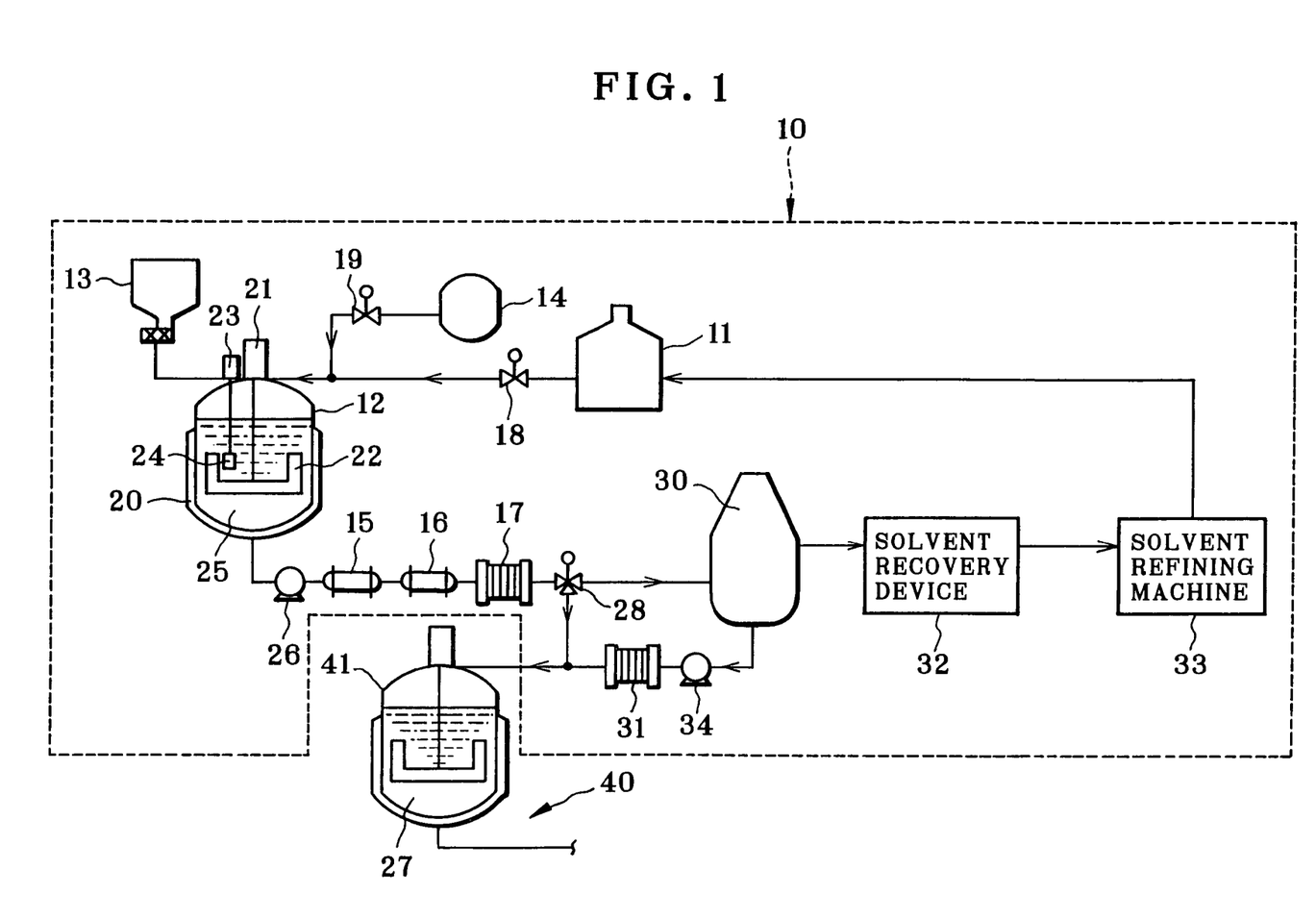
FIG. 1 is an explanatory view illustrating a dope producing system.

At first, dope is produced by use of the above raw materials. In FIG. 1, a dope producing system 10 includes a solvent tank or reservoir 11, a dissolving tank or reservoir 12, a hopper 13, and an additive tank or reservoir 14. The dissolving tank 12 mixes TAC and the like with the solvent. The hopper 13 supplies the TAC. The additive tank 14 stores additives. Furthermore, the dope producing system 10 includes a heater 15, a temperature adjuster 16, a filtration chamber 17, a flash evaporator or flash device 30 for liquid flash, a filtration chamber 31, a solvent recovery device 32 and a solvent refining machine 33. The heater 15 applies heat to swollen liquid which will be described later. The flash evaporator or flash device 30 condenses prepared dope. A polymer film producing system 40 is positioned downstream from the dope producing system 10. A storing tank or reservoir 41 of the polymer film producing system 40 is connected with the dope producing system 10.

Dope is produced by the dope producing system 10. At first, a valve 18 is set in its open position, to introduce a solvent to the dissolving tank or reservoir 12 from the solvent tank or reservoir 11. Then TAC stored in the hopper 13 is introduced to the dissolving tank 12 in a manner of controlling an amount. Also, a valve 19 is shifted between open and closed positions, to introduce additive solution to the dissolving tank 12 from the additive tank 14 at an amount suitable for use.

Note that it is possible to deliver an additive to the dissolving tank or reservoir 12 in a normally liquid phase at a room temperature, unlike the solution of the initially solid additive in a solvent. Furthermore, if an additive is solid at a room temperature, the additive can be delivered to the dissolving tank 12 by use of a hopper for the solid additive. To use a plurality of additives, a plurality of solutions can be prepared with additives mixed therewith, and can be mixed up in the additive tank 14. Also, a multi conduit delivery can be used, in which a plurality of additive reservoirs are used for storing solutions of additives in solvents, and plural conduits are connected for delivery of the additive solutions to the dissolving tank 12.

According to the above description, the process of delivery to the dissolving tank or reservoir 12 is in a sequence of solvent, TAC and then additives. However, the process can be according to a sequence different from this. It is possible to introduce solvent of a preferred amount after measuring and introducing the TAC to the dissolving tank 12. Furthermore, additives may not be prepared in the dissolving tank 12 initially. It is possible in subsequent steps to mix additives to a composition containing TAC and solvent.

The dissolving tank or reservoir 12 has a jacket 20 and a first stirrer or anchor stirrer 22. The jacket 20 is disposed about the dissolving tank or reservoir 12. A motor 21 drives the anchor stirrer 22 for rotations. Preferably, a second stirrer or dissolver stirrer 24 is used, which a motor 23 drives for rotations. The anchor stirrer 22 and the dissolver stirrer 24 may be replaced by any suitable type of stirring blade. Heat exchange medium is preferably caused to flow through the jacket 20, to condition the dissolving tank 12 thermally in a range from −10 to 55 deg. C. A swollen liquid 25 can be obtained by selectively driving the anchor stirrer 22 and the dissolver stirrer 24, the swollen liquid 25 containing the solvent and the TAC swollen in the solvent.

A pump 26 delivers the swollen liquid 25 to the heater 15. It is preferable that conduits with a jacket are incorporated in the heater 15. Also, a structure for pressurizing the swollen liquid 25 is associated with the heater 15. A dope 27 is obtained by use of the swollen liquid 25 conditioned in application of heat or application of pressure and heat, and by dissolving TAC or other solute in a solvent. This method is referred to as thermal dissolution. During the dissolution, the swollen liquid 25 should be kept at a temperature of 50-120 deg. C. Also, a process of cooling dissolution can be used, in which the swollen liquid 25 is cooled at a temperature between −30 and −100 deg. C. The TAC can be dissolved in the solvent sufficiently by suitable selection of the thermal-dissolution and cooling dissolution. The temperature adjuster 16 conditions the dope 27 at the room temperature. The filtration chamber 17 filtrates the dope 27 to eliminate impurity. In the filtration chamber 17, a filter has a preferable pore diameter of which an average is 100 microns or less. A filtration flow rate is preferably 50 liters/$mm^2$.hr or more. A valve 28 is opened and closed to cause the filtrated dope 27 to flow to the storing tank 41 of the polymer film producing system 40.

The dope 27 can be used for solution casting to form a polymer film. However, obtaining the dope 27 from the swollen liquid 25 after preparing the swollen liquid 25 causes a problem in long time typically required for high target density of the TAC, and in high cost. In view of this, a dope of a low density can be preferably prepared at first in comparison with the target density, before condensation is made for preparing the dope at the higher target density. The flash evaporator or flash device 30 is supplied by the valve 28 with the dope filtrated by the filtration chamber 17. Part of the solvent in the dope is evaporated in the flash device 30. The solvent in the gas phase is liquefied by a condenser (not shown), and collected by the solvent recovery device 32. The solvent refining machine 33 is supplied with the collected solvent, and refines a solvent ready for use in preparing the dope. The use of the solvent refining machine 33 is effective in reducing the manufacturing cost.

After the condensation, a pump 34 is used to remove the dope 27 from the flash evaporator or flash device 30. Also, bubbles can be preferably eliminated from the dope 27. Any known defoaming methods can be used for removing bubbles, for example, ultrasonic defoaming. After this, the filtration chamber 31 is supplied with the dope 27, and removes particles or other foreign materials from the dope 27. In the filtration chamber 31, the temperature of the dope 27 can be preferably kept at 0-200 deg. C.

[Solution Casting]

Figure 2:
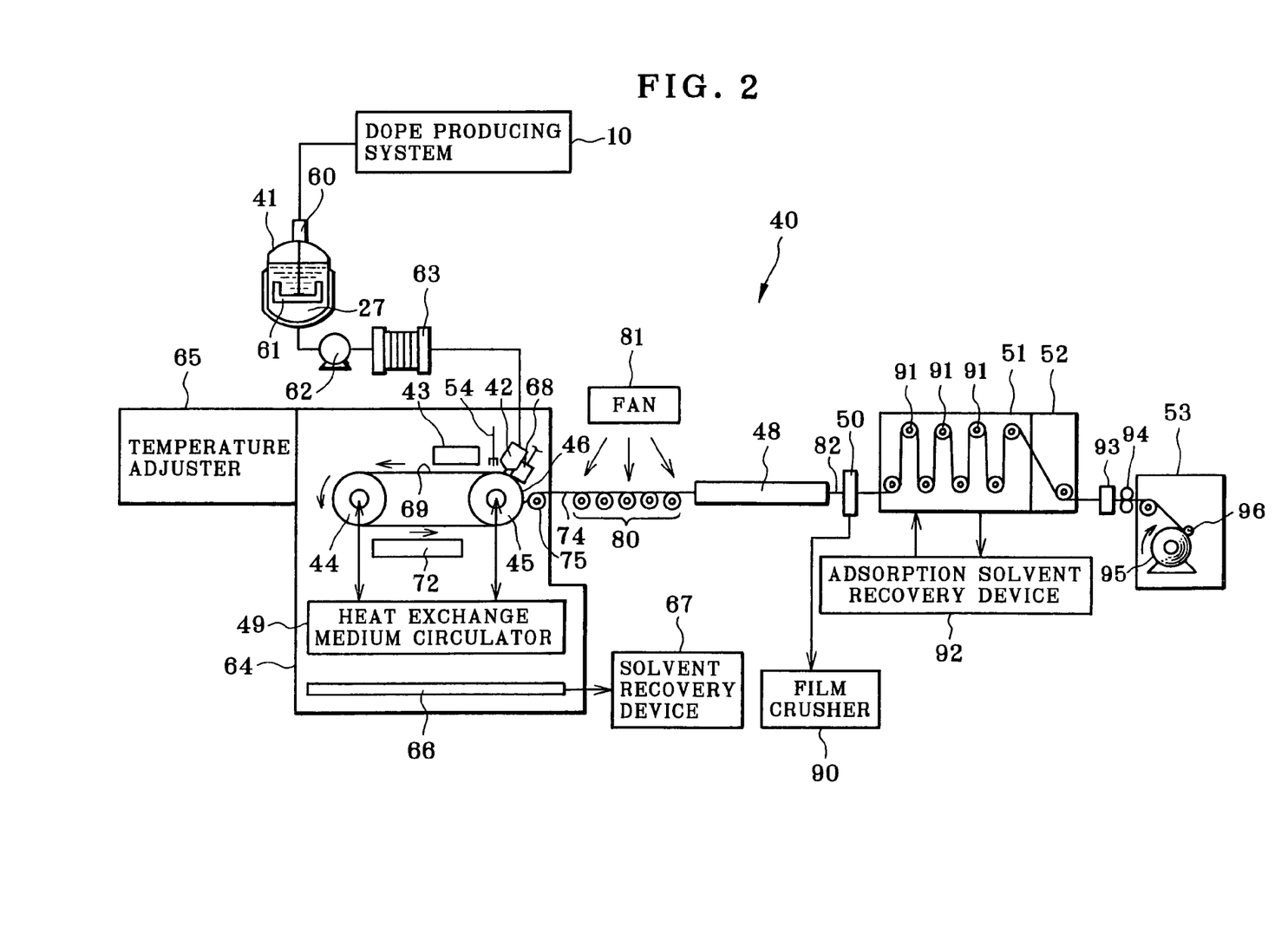
FIG. 2 is an explanatory view in side elevation illustrating a polymer film producing system.

Production of polymer film from the dope 27 obtained above is described now. In FIG. 2, the polymer film producing system 40 is illustrated schematically. The polymer film producing system 40 includes the storing tank or reservoir 41 and a casting die 42, a drier 43, a casting support belt 46, a tentering type of drier 48, a web edge slitter 50, a drier 51, a cooler 52, and a winder 53. Rotatable support rollers or belt drums 44 and 45 are disposed to support the casting support belt 46 for turning and casting of a cast film.

A dissolver stirrer 61 is disposed in the storing tank or reservoir 41. A motor 60 rotates the dissolver stirrer 61. There are a gear pump 62 and a filtration chamber 63 disposed between the storing tank 41 and the casting die 42 in connection with the storing tank 41.

The drier 43 is positioned downstream from the casting die 42. A cast film 69 formed by casting of the casting die 42 is received in the drier 43, where dry gas flows to the cast film 69. A labyrinth seal 54 is disposed between the casting die 42 and the drier 43. The labyrinth seal 54 suppresses a flow of the dry gas to the casting die 42 from the drier 43.

A driving mechanism (not shown) causes the support rollers 44 and 45 to rotate to turn the casting support belt 46 about endlessly. A speed of the casting support belt 46 is equal to or more than 10 m/min and equal to or less than 200 m/min, preferably equal to or more than 15 m/min and equal to or less than 150 m/min, and desirably equal to or more than 20 m/min and equal to or less than 120 m/min. Should the speed be less than 10 m/min, productivity of the film will be too low. Should the speed be more than 200 m/min, bead of casting cannot be stably formed, to lower surface quality of the cast film 69.

A heat exchange medium circulator 49 should be preferably associated with the support rollers 44 and 45 for controlling a surface temperature of the casting support belt 46. A preferable adjustable range of the surface temperature of the casting support belt 46 is from −20 to 40 deg. C. A flow conduit for a heat exchange medium is formed through the support rollers 44 and 45, and keeps the support rollers 44 and 45 at a target temperature by flow of the heat exchange medium at a prescribed temperature.

A width of the casting support belt 46 may not be limited to a certain size. A preferable width of the casting support belt 46 can be preferably 1.1-2.0 times as much as a casting width of the dope 27. A length of the casting support belt 46 is preferably 20-200 meters. A thickness of the casting support belt 46 is 0.5-2.5 mm. A surface roughness of the casting support belt 46 is 0.05 micron or less owing to polishing the belt surface. The material of the casting support belt 46 is preferably stainless steel, for example SUS 316, and has sufficient strength and resistance to corrosion. Irregularity of the thickness of the casting support belt 46 is preferably 0.5% or less.

The support rollers 44 and 45 can be a drum-shaped support for casting in place of the casting support belt 46. It is preferable to rotate the support rollers 44 and 45 with such high precision that fluctuation of rotations is as small as 0.2 mm or lower. An average surface roughness of the support rollers 44 and 45 can be 0.01 micron or less. Thus, the support rollers 44 and 45 are finished by chrome plating or the like for imparting sufficient hardness and durability. It is necessary to minimize the surface defects of the support which may be the casting support belt 46 or the support rollers 44 and 45. Specifically, an amount of a pinhole in a size of 30 microns or more should be zero. An amount of a pinhole in a size equal to or more than 10 microns and less than 30 microns should be one (1) or less per sq. meter. An amount of a pinhole in a size less than 10 microns should be two (2) or less per sq. meter.

A casting chamber 64 contains the casting die 42 and the casting support belt 46. A temperature adjuster 65 and a condenser 66 are disposed in the casting chamber 64. The temperature adjuster 65 adjusts the inner temperature for setting at a predetermined temperature level. The condenser 66 condenses and recovers the gaseous organic solvent. A solvent recovery device 67 is disposed outside the casting chamber 64 for recovery of liquefied organic solvent. A decompressing chamber 68 is preferably installed for pressure control of a rear space of a casting bead extending from the casting die 42 to the casting support belt 46. A vent 72 is an auxiliary opening for flow of gas.

There is a transition assembly 80, where a fan or blower 81 is installed. A film crusher or grinder 90 is connected with the web edge slitter 50 positioned downstream from the tentering type of drier 48. Web edges of polymer film 82 being cut are minutely cut by the film crusher 90 for discarding.

A number of rollers 91 are contained in the drier 51. Also, an adsorption solvent recovery device 92 is contained in the drier 51, and adsorbs and collects the gasified content of the solvent. Note that a humidity conditioning chamber (not shown) is preferably installed between the drier 51 and the cooler 52 instead of positioning the cooler 52 directly next to the drier 51. An electrostatic elimination bar 93 is installed for keeping a potential of the polymer film 82 being electrified in a predetermined range, for example from −3 kV to +3 kV. In the embodiment, the electrostatic elimination bar 93 in FIG. 2 is disposed downstream from the cooler 52, but may be positioned in a modified manner. Furthermore, a knurling roller 94 is preferably used downstream from the electrostatic elimination bar 93, to knurl web edge portions of the polymer film 82 by embossing. A winding roller 95 and a press roller 96 are positioned inside the winder 53. The winding roller 95 winds the polymer film 82. The press roller 96 adjusts tension applied to the polymer film 82 in the course of the winding. A knurled pattern of projections/recesses is preferably as thick as 1-200 microns.

Figure 3:
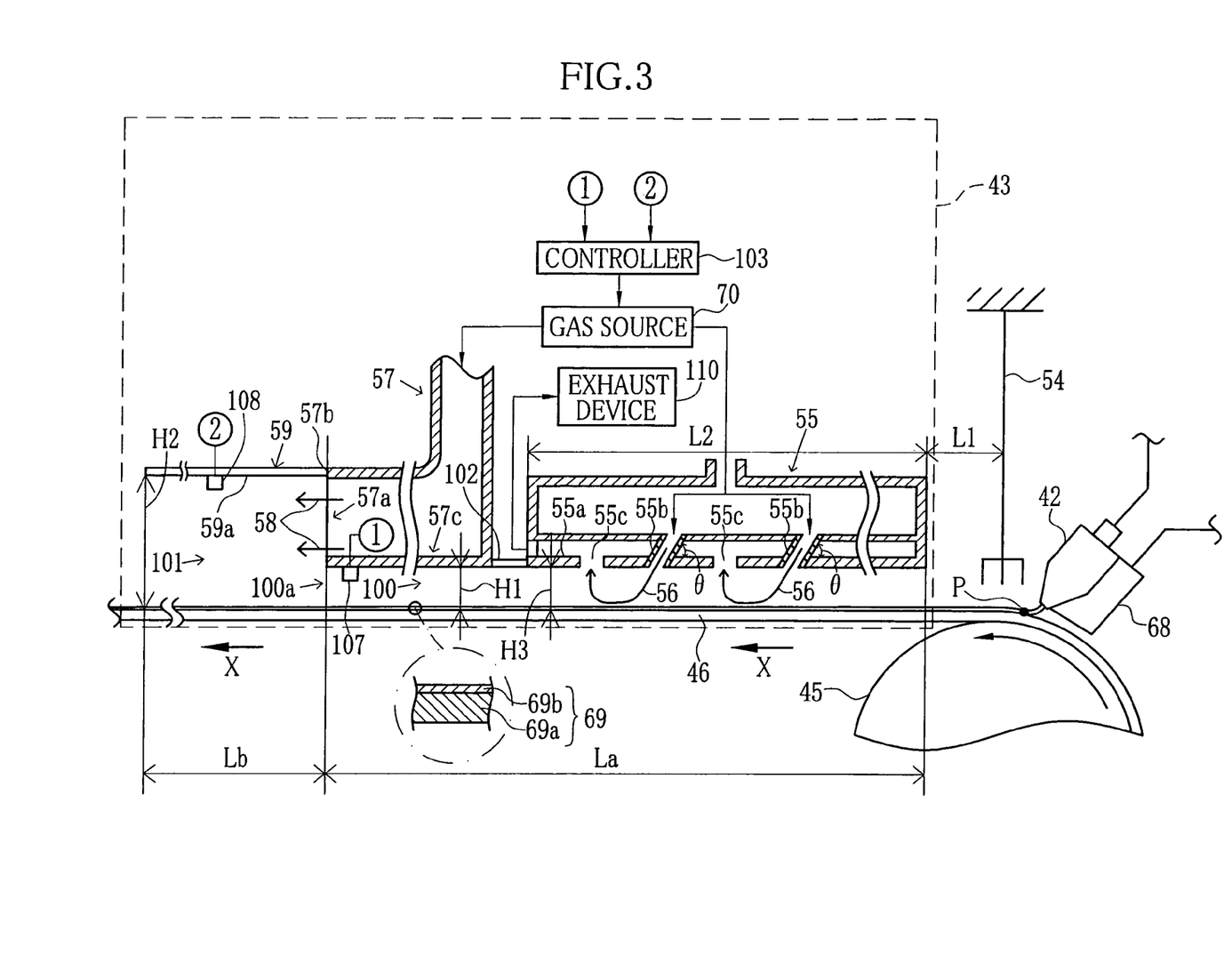
FIG. 3 is an explanatory view in side elevation illustrating a drier.

In FIG. 3, the drier 43 positioned after the casting die 42 includes a first gas flow duct 55 as first gas flow device, a second gas flow duct 57 as second gas flow device, and a gas source 70. The gas flow ducts 55 and 57 provide a flow of dry gas to the cast film 69. The gas source 70 with a pump supplies the gas flow ducts 55 and 57 with gas in a predetermined condition.

The first gas flow duct 55 is in a box shape. A gas blow wall 55a of the first gas flow duct 55 is opposed to the casting support belt 46. Gas nozzles 55b as first gas outlet are formed in the gas blow wall 55a. Each of the gas nozzles 55b has a channel shape extending in the width direction of the casting support belt 46. The number of the gas nozzles 55b is one or more arranged in the X direction of running of the casting support belt 46. An angle θ of the gas nozzles 55b with respect to the X direction is equal to or more than 30 degrees and equal to or less than 60 degrees. Dry gas 56 is blown through the gas nozzles 55b. Note that the gas nozzles 55b may be used for letting in and out dry gas instead of simply letting out the dry gas 56.

Vent channels 55c are further formed in the gas blow wall 55a, disposed near to the gas nozzles 55b as first gas outlet, and arranged in the X direction, for passage of part of the dry gas 56 blown through the gas nozzles 55b. An exhaust device 110 or pump is connected for exhaust through the vent channels 55c. The dry gas 56 enters the vent channels 55c by flowing in the X direction near to the cast film 69, and is exhausted by the exhaust device 110. Note that the gas nozzles 55b and the vent channels 55c, arranged alternately in the X direction, may be arranged differently. The numbers of the gas nozzles 55b and the vent channels 55c, distances between the gas nozzles 55b, and distances from the gas nozzles 55b to the vent channels 55c may be changed suitably.

The dry gas 56 is blown to a surface of the cast film 69. This is to form a second layer portion 69b on an air surface side disposed over a first layer portion 69a on a casting support side. The second layer portion 69b included in the cast film 69 has a certain depth from the surface of the cast film 69, and has a smaller solvent content than the first layer portion 69a. The use of the dry gas 56 is for the purpose of raising smoothness. The second layer portion 69b is referred to as an initial layer portion formed in an initial step in forming the cast film 69. Forming of the second layer portion 69b causes a gradual decrease of the solvent content in the first layer portion 69a in a subsequent step. When the cast film 69 is stripped from the casting support belt 46, the cast film 69 has a self-supporting property as the cast film 69 has 50% of a solid content.

A gas outlet 57a or gas port of the second gas flow duct 57 is open in the X direction. The second gas flow duct 57 in the box shape is positioned downstream from the first gas flow duct 55. Dry gas 58 is caused to flow out of the gas outlet 57a in the X direction. A flow regulating wall or upper wall 59 extends from an upper wall 57b of the gas outlet 57a in the X direction. The flow regulating wall 59 regulates the direction of the dry gas 58 to flow reliably in parallel with the cast film 69.

A first flow path 100 is formed between the casting support belt 46 and a middle wall 57c of the second gas flow duct 57 and the gas blow wall 55a of the first gas flow duct 55 for passage of the dry gas 56. Also, a second flow path 101 is formed to extend from the gas outlet 57a or gas port of the second gas flow duct 57 at a predetermined length, for passage of the dry gas 58.

The gas outlet 57a or gas port is positioned higher than the upper end of the first flow path 100 at the height H1, and causes the dry gas 58 to flow out in the X direction. Gas pressure of an exit 100a of the first flow path 100 is rendered lower than that of the second flow path 101. Thus, the dry gas 56 passing through the first flow path 100 comes to the second flow path 101. The second layer portion 69b can be formed smoothly by forcibly directing the flow of the dry gas 56 in the X direction near to the cast film 69. Flatness of the cast film 69 can be higher owing to the high smoothness of the second layer portion 69b.

A height H1 is a distance from a surface of the casting support belt 46 to the middle wall 57c of the second gas flow duct 57. A height H2 of the second flow path 101 is a distance from a lower surface 59a of the flow regulating wall or upper wall 59 to the surface of the casting support belt 46, and is greater than the height H1. It is experimentally found that, when the height H1 is equal to or more than 20 mm and equal to or less than 300 mm, the second layer portion 69b can be formed with high smoothness, to impart high surface quality to the polymer film as a final product. Also, when the height H2 is equal to or more than 20 mm and equal to or less than 300 mm, the second layer portion 69b can be formed with high smoothness.

The length La of the first flow path 100 is from one end of the first gas flow duct 55 at the casting die 42 to the gas outlet 57a of the second gas flow duct 57. The length Lb of the second flow path 101 is a predetermined distance from the gas outlet 57a, and specifically is a maximum range of the reach of the dry gas 58. The dry gas 56 is caused to blow the cast film 69 in the first flow path 100, to form the second layer portion 69b with smoothness. The dry gas 58 at a great amount is blown into the second flow path 101 in comparison with the dry gas 56. Gas density of solvent is lowered in the second flow path 101, to quicken drying of the cast film 69 by encouraging evaporation of solvent in the cast film 69. Thus, it is preferable that La<Lb because the cast film 69 should be moved to the second flow path 101 as soon as the second layer portion 69b is formed.

A value $\alpha 1 = V1/(H1^{1/2})$ obtained by dividing the flow rate V1 (m/sec) of the dry gas 56 by a square root of the height H1 can be equal to or more than 20 and equal to or less than 150 in order to form the second layer portion 69b smoothly. A value $\alpha 2 = V2/(H2^{1/2})$ obtained by dividing the flow rate V2 (m/sec) of the dry gas 58 by a square root of the height H2 can be equal to or more than 20 and equal to or less than 150 in order to form the second layer portion 69b smoothly. A height H3 as a distance from the surface of the casting support belt 46 to the gas blow wall 55a is preferably equal to the height H1. However, the height H3 may be greater or smaller than the height H1 by a small difference. In the embodiment, H1 and H2 are constant values. However, it is further possible to use a shifting mechanism (not shown) for shifting up and down the first gas flow duct 55, the second gas flow duct 57 and an upper surface of the flow regulating wall or upper wall 59 so as to change values of H1 and H2 as desired for the purpose.

Time taken before the flow of the dry gas 56 on to the cast film 69 after starting the contact of the dope 27 with the casting support belt 46 at the point P in FIG. 3 is equal to or less than 15 seconds, preferably equal to or less than 5 seconds, and desirably equal to or less than 3 seconds. A preferable duration of flow of the dry gas 56 on to the cast film 69, within 15 seconds after the start of forming, is 3 seconds or more. Temperature of the dry gas 56 is equal to or higher than 40 deg. C. and equal to or lower than 150 deg. C., and preferably equal to or higher than 80 deg. C. and equal to or lower than 145 deg. C., and desirably equal to or higher than 100 deg. C. and equal to or lower than 140 deg. C. Should the temperature be lower than 40 deg. C., evaporation of solvent in the cast film 69 will be too slow. Should the temperature be higher than 150 deg. C., foaming of the cast film 69 may occur with abrupt evaporation of the solvent in the cast film 69. Forming of the second layer portion 69b will be extremely difficult.

A flow regulating panel 102 is disposed between the gas flow ducts 55 and 57 for directing a flow of the dry gas 56 in the X direction. This facilitates the reach of the dry gas 56 from the first gas flow duct 55 to the second flow path 101 after passage in the first flow path 100.

Dimensions and distances of the labyrinth seal 54, the first gas flow duct 55, the flow regulating panel 102 and the second gas flow duct 57 are described. A distance L1 between the labyrinth seal 54 and the first gas flow duct 55 is preferably equal to or more than 50 mm and equal to less than 1,000 mm. A width L2 of the first gas flow duct 55 is preferably equal to or more than 1,000 mm and equal to less than 5,000 mm.

The gas source 70 supplies the first gas flow duct 55 with the dry gas 56, and supplies the second gas flow duct 57 with the dry gas 58. A controller 103 is connected with the gas source 70 and discretely controls the flow rate V1 of the dry gas 56 and the flow rate V2 of the dry gas 58.

The controller 103 controls the gas source 70 with a pump according to the flow rates V1 and V2 being input. A first flow meter 107 is disposed on the middle wall 57c of the second gas flow duct 57. A second flow meter 108 is disposed on the lower surface 59a of the flow regulating wall or upper wall 59. The flow meters 107 and 108 measure flow rates Va and Vb of the dry gases 56 and 58 respectively in the first and second flow paths 100 and 101. Information of the flow rates is sent to the controller 103. If a difference between the flow rates Va and V1 or a difference between the flow rates Vb and V2 is more than predetermined level, then the controller 103 finely adjusts the flow rates V1 and V2. It is preferable that, when the difference is excessively higher than the predetermined level, warning information may be indicated in a display panel (not shown).

In the solution casting of the invention, the dopes, namely two or more dopes, can be cast according to simultaneous multi casting or successive multi casting. Also, those two methods of casting can be combined with one another. For the simultaneous multi casting, it is possible to use any one of a casting die with a feed block, and a multi-manifold casting die. The thickness of one of the cast films disposed on the air surface side, and/or another of them disposed on the casting support side, is preferably 0.5-30% of the total thickness of the cast films. Also, it is preferable in the course of the simultaneous multi casting to wrap part of high-viscosity dope with part of low-viscosity dope among the dopes. It is preferable for the first selected dope on the air surface side to contain a higher amount of alcohol than that of the second selected dope on the casting support side.

Various methods suggested in JP-A 2005-104148 are usable in combination to the casting of the invention, the methods including construction of the casting die, decompression chamber, support and other mechanical elements, multi casting, stripping, stretching, conditioning for drying in respective steps, polymer film handling, winding after eliminating a curl for flatness, solvent collection, polymer film collection. Those can be used in the present invention.

A. Support of Metal for Solution Casting

Suggested in JP A 2000-84960; U.S. Pat. Nos. 2,336,310, 2,367,603, 2,492,078, 2,492,977, 2,492,978, 2,607,704, 2,739,069, 2,739,070, GB A 640731 (corresponding to U.S. Pat. No. 2,492,977), GB A 735892; JP B 45-4554, JP B 49-5614, JP A 60-176834, JP A 60-203430, and JP A 62-115035.

B. Multi Casting

Suggested in JP B 62-43846; JP A 61-158414, JP A 1-122419, JP B 60-27562, JP A 61-94724, JP A 61-947245, JP A 61-104813, JP A 61-158413, JP A 6-134933; JP A 56-162617; JP A 61-94724, JP A 61-94725, and JP A 11-198285.

C. Specific Methods of Casting of Cellulose Esters

Suggested in JP A 61-94724, JP A 61-148013, JP A 4-85011 (corresponding to U.S. Pat. No. 5,188,788), JP A 4-286611, JP A 5-185443, JP A 5-185445, JP A 6-278149, and JP A 8-207210.

D. Stretching

Suggested in JP A 62-115035, JP A 4-152125, JP A 4-284211, JP A 4-298310, and JP A 11-48271.

E. Specific Methods of Drying

Suggested in JP A 8-134336, JP A 8-259706, and JP A 8-325388.

F. Drying of Specific Controls of Heat

Suggested in JP A 04-001009 (corresponding to U.S. Pat. No. 5,152,947), JP A 62-046626, JP A 04-286611, and JP A 2000-002809.

G. Drying in Preventing Wrinkles

Suggested in JP A 11-123732, JP A 11-138568, and JP A 2000-176950.

A web width of the polymer film after the production is preferably equal to or more than 1,400 mm and equal to or less than 2,500 mm. Even when the width is 2,500 mm or more, the effects of the invention can be acquired. A thickness of the polymer film as product is equal to or more than 20 microns and equal to or less than 100 microns, and preferably equal to or more than 30 microns and equal to or less than 90 microns, and desirably equal to or more than 40 microns and equal to or less than 80 microns.

[Curls, Thickness and their Measurement]

Curls, thickness and their measurement of the wound cellulose acylate film are suggested in known documents mentioned in JP-A 2005-104148. These can be used in the present invention.

[Surface Processing]

At least one of the two surfaces of the cellulose ester film is preferably processed by surface processing. Examples of the surface processing include vacuum glow discharge processing, atmospheric pressure plasma discharge processing, ultraviolet radiation applying processing, corona discharge processing, flame processing, acid processing, alkali processing and the like.

[Functioning Layers]

Also, at least one of the two surfaces of the cellulose ester film can be coated with an undercoat. Various types of the undercoat can be used.

A polymer as a final product can preferably be a functioning material including the polymer film as base, and at least one other functioning layer. Examples of functioning layers include an antistatic layer, a hard resin layer, anti reflection layer, attachment facilitating layer, anti-glare layer, optical compensation layer and the like.

At least one surface active agent can be preferably included in the functioning layers in a range of 0.1-1,000 mg per sq. meter. At least one smoothing agent can be included in the functioning layers in a range of 0.1-1,000 mg per sq. meter. At least one matte agent can be included in the functioning layers in a range of 0.1-1,000 mg per sq. meter. Further, at least one antistatic agent can be included in the functioning layers in a range of 1-1,000 mg per sq. meter. Methods of adding the surface processed functioning layers to the cellulose ester film, and their various conditions are according to techniques suggested in JP-A 2005-104148. Those can be used in the present invention.

I. Plasma Processing in General

Suggested in JP A 6-123062, JP A 11-5857, and JP A 11-293011.

II. Specific Methods of Plasma Processing

Suggested in JP A 2003-161807, JP A 2003-166063 (corresponding to U.S. Pat. No. 6,849,306), JP A 2003-171770, JP A 2003-183836, JP A 2003-201568, and JP A 2003-201570.

III. Glow Discharge Processing

Suggested in U.S. Pat. Nos. 3,462,335, 3,761,299, 4,072,769, GB A 891469; JP A 59-556430; and JP B 60-16614.

IV. Ultraviolet Processing

Suggested in JP B 43-2603, JP B 43-2604, and JP B 45-3828.

V. Corona Discharge Processing

Suggested in JP B 39-12838, JP A 47-19824, JP A 48-28067, and JP A 52-42114.

VI. Matte Agents for Undercoats

Suggested in U.S. Pat. Nos. 4,142,894, and 4,396,706.

VII. Lubricants

Suggested in JP B 53-292, U.S. Pat. Nos. 3,933,516, 4,275,146; JP B 58-33541, GB A 927446 (corresponding to U.S. Pat. No. 3,121,060); JP A 55-126238, JP A 58-90633; JP A 58-50534; and European Patent Application 90108115 (corresponding to U.S. Pat. No. 5,063,147).

VIII. Polyorganosiloxanes as Lubricants

Suggested in JP B 53-292, JP B 55-49294, and JP A 60-140341.

IX. Antistatic Agents of Ionic Macromolecular Types

Suggested in JP B 49-23827, JP B 49-23828, JP B 47-28937; JP B 55-734, JP A 50-54672, JP B 59-14735, JP B 57-18175, JP B 57-18176, JP B 57-56059; JP B 53-13223, JP B 57-15376, JP B 53-45231, JP B 55-145783, JP B 55-65950, JP B 55-67746, JP B 57-11342, JP B 57-19735, JP B 58-56858, JP A 61-27853, and JP B 62-9346.

X. Polymer Films Coatable with Hard Coat Layers

Suggested in JP A 6-123806, JP A 9-113728, and JP A 9-203810.

XI. Photopolymerizable Compounds

Suggested in JP A 50-151996, JP A 50-158680; JP A 50-151997 (corresponding to U.S. Pat. No. 4,058,401), JP A 52-30899 (corresponding to U.S. Pat. No. 4,256,828), JP A 55-125105; JP A 56-8428 (corresponding to U.S. Pat. No. 4,299,938), JP A 56-55420 (corresponding to U.S. Pat. No. 4,374,066), JP A 56-149402 (corresponding to U.S. Pat. No. 4,339,567), JP A 57-192429 (corresponding to U.S. Pat. No. 4,387,216); JP B 49-17040; and U.S. Pat. No. 4,139,655.

XII. Coatings for Preventing Reflection

Suggested in JP A 7-126552, JP A 7-188582, JP A 8-48935, JP A 8-100136, JP A 9-220791, and JP A 9-272169.

[Uses]

The above-described cellulose ester film is useful particularly as a polarizer protecting film. A panel shaped polarizer is obtained by attachment of cellulose ester films on a polarizer element. Two panel shaped polarizers are attached to a liquid crystal layers to create a liquid crystal display panel. Note that the order of the layers or films may be modified. Various examples of liquid crystal display panels are known and suggested in JP-A 2005-104148, including TN type, STN type, VA type, OCB type, reflection type and the like. Any of those can be used in the present invention. The prior art also suggests cellulose ester film including an optical anisotropic layer, and cellulose ester film with an anti-reflection property or antiglare property. Also, the use of biaxial cellulose ester film as optical compensation film is disclosed with suitable optical characteristics. Furthermore, cellulose ester film can be used both for the optical compensation film and the polarizer protecting film. The features can be combined with the present invention. Details of those are according to various suggested techniques mentioned in JP-A 2005-104148.

No. 1. Cellulose ester protective films for polarizers

Suggested in JP A 10-095861, JP A 10-095862, and JP A 09-113727.

No. 2. Uses of cellulose ester films as high performance optical elements

Suggested in JP A 2000-284124, JP A 2000-284123, and JP A 11-254466.

No. 3. Production of cellulose ester films as high performance optical elements

Suggested in JP A 2000-131523, JP A 06-130226, JP A 06-235819, JP A 2000-212298 (corresponding to U.S. Pat. No. 6,731,357), and JP A 2000-204173.

No. 4. Optical Compensation Sheets

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 5. TN type of LCD panels

Suggested in JP A 3-9325 (corresponding to U.S. Pat. No. 5,132,147), JP A 6-148429, JP A 8-50206 (corresponding to U.S. Pat. No. 5,583,679), and JP A 9-26572 (corresponding to U.S. Pat. No. 5,855,971).

No. 6. Reflection type of LCD panels

Suggested in JP A 10-123478, WO 9848320 (corresponding to U.S. Pat. No. 6,791,640), JP B 3022477 (corresponding to U.S. Pat. No. 6,433,845); and WO 00-65384 (corresponding to EP A 1182470).

No. 7. Discotic compounds as coating cellulose ester films

Suggested in JP A 7-267902, JP A 7-281028 (corresponding to U.S. Pat. No. 5,518,783), and JP A 7-306317.

No. 8. Characteristics of optical compensation sheets

Suggested in JP A 8-5837, JP A 7-191217, JP A 8-50206, and JP A 7-281028.

No. 9. Production of optical compensation sheets

Suggested in JP A 9-73081, JP A 8-160431, and JP A 9-73016.

No. 10. Use of cellulose ester films in LCD panels

Suggested in JP A 8-95034, JP A 9-197397, and JP A 11-316378.

No. 11. LCD elements of guest-host reflection types

Suggested in JP A 6-222350, JP A 8-36174, JP A 10-268300, JP A 10-292175, JP A 10-293301, JP A 10-311976, JP A 10-319442, JP A 10-325953, JP A 10-333138, and JP A 11-38410.

No. 12. Coating methods

Suggested in U.S. Pat. Nos. 2,681,294; 2,761,791, 2,941,898, 3,508,947, and 3,526,528.

No. 13. Constructions of overlaying coatings

Suggested in JP A 8-122504, JP A 8-110401, JP A 10-300902 (corresponding to U.S. Pat. No. 6,207,263), JP A 2000-111706; JP A 10-206603 (corresponding to U.S. Pat. No. 6,207,263), and JP A 2002-243906.

No. 14. High refractive index layer and middle refractive index layer

Suggested in JP A 11-295503, JP A 11-153703, JP A 2000-9908; JP A 2001-310432; JP A 2001-166104; JP A 11-153703,U.S. Pat. No. 6,210,858, JP A 2002-2776069; JP A 2000-47004, JP A 2001-315242, JP A 2001-31871, JP A 2001-296401; and JP A 2001-293818.

No. 15. Low refractive index layer

Suggested in JP A 9-222503; JP A 11-38202; JP A 2001-40284; JP A 2000-284102; JP A 11-258403; JP A 58-142958, JP A 58-147483, JP A 58-147484, JP A 9-157582, JP A 11-106704; JP A 2000-117902, JP A 2001-48590, and JP A 2002-53804.

No. 16. Hard coat layer

Suggested in JP A 2002-144913, JP A 2000-9908, and WO 00/46617 (corresponding to U.S. Pat. No. 7,063,872).

No. 17. Front scattering layer

Suggested in JP A 11-38208, JP A 2000-199809, and JP A 2002-107512.

No. 18. Antiglare characteristic Suggested in Japanese Patent Application 2000-271878 (corresponding to JP A 2002-082207); JP A 2001-281410, Japanese Patent Application 2000-95893 (corresponding to U.S. Pat. No. 6,778,240), JP A 2001-100004 (corresponding to U.S. Pat. No. 6,693,746), JP A 2001-281407; JP A 63-278839, JP A 11-183710, and JP A 2000-275401.

No. 19. Dichroic compounds

Suggested in JP A 1-161202, JP A 1-172906, JP A 1-172907, JP A 1-183602, JP A 1-248105, JP A 1-265205, and JP A 7-261024 (corresponding to U.S. Pat. No. 5,706,131).

No. 20. Various devices and films for optics

Suggested in JP A 5-19115, JP A 5-119216, JP A 5-162261, JP A 5-182518, JP A 5-196819, JP A 5-264811, JP A 5-281411, JP A 5-281417, JP A 5-281537, JP A 5-288921, JP A 5-288923, JP A 5-311119, JP A 5-339395, JP A 5-40204, JP A 5-45512, JP A 6-109922, JP A 6-123805, JP A 6-160626, JP A 6-214107, JP A 6-214108, JP A 6-214109, JP A 6-222209, JP A 6-222353, JP A 6-234175, JP A 6-235810, JP A 6-241397, JP A 6-258520, JP A 6-264030, JP A 6-305270, JP A 6-331826, JP A 6-347641, JP A 6-75110, JP A 6-75111, JP A 6-82779, JP A 6-93133, JP A 7-104126, JP A 7-134212, JP A 7-181322, JP A 7-188383, JP A 7-230086, JP A 7-290652, JP A 7-294903, JP A 7-294904, JP A 7-294905, JP A 7-325219, JP A 7-56014, JP A 7-56017, JP A 7-92321, JP A 8-122525, JP A 8-146220, JP A 8-171016, JP A 8-188661, JP A 8-21999, JP A 8-240712, JP A 8-25575, JP A 8-286179, JP A 8-292322, JP A 8-297211, JP A 8-304624, JP A 8-313881, JP A 8-43812, JP A 8-62419, JP A 8-62422, JP A 8-76112, JP A 8-94834, JP A 9-137143, JP A 9-197127, JP A 9-251110, JP A 9-258023, JP A 9-269413, JP A 9-269414, JP A 9-281483, JP A 9-288212, JP A 9-288.213, JP A 9-292525, JP A 9-292526, JP A 9-294959, JP A 9-318817, JP A 9-80233, JP A 9-99515, JP A 10-10320, JP A 10-104428, JP A 10-111403, JP A 10-111507, JP A 10-123302, JP A 10-123322, JP A 10-123323, JP A 10-176118, JP A 10-186133, JP A 10-264322, JP A 10-268133, JP A 10-268134, JP A 10-319408, JP A 10-332933, JP A 10-39137, JP A 10-39140, JP A 10-68821, JP A 10-68824, JP A 10-90517, JP A 11-116903, JP A 11-181131, JP A 11-211901, JP A 11-211914, JP A 11-242119, JP A 11-246693, JP A 11-246694, JP A 11-256117, JP A 11-258425, JP A 11-263861, JP A 11-287902, JP A 11-295525, JP A 11-295527, JP A 11-302423, JP A 11-309830, JP A 11-323552, JP A 11-335641, JP A 11-344700, JP A 11-349947, JP A 11-95011, JP A 11-95030, JP A 11-95208, JP A 2000-109780, JP A 2000-110070, JP A 2000-119657, JP A 2000-141556, JP A 2000-147208, JP A 2000-17099, JP A 2000-171603, JP A 2000-171618, JP A 2000-180615, JP A 2000-187102, JP A 2000-187106, JP A 2000-191819, JP A 2000-191821, JP A 2000-193804, JP A2000-204189, JP A 2000-206306, JP A 2000-214323, JP A 2000-214329, JP A 2000-230159, JP A 2000-235107, JP A 2000-241626, JP A 2000-250038, JP A 2000-267095, JP A 2000-284122, JP A 2000-292780, JP A 2000-292781, JP A 2000-304927, JP A 2000-304928, JP A 2000-304929, JP A 2000-309195, JP A 2000-309196, JP A 2000-309198, JP A 2000-309642, JP A 2000-310704, JP A 2000-310708, JP A 2000-310709, JP A 2000-310710, JP A 2000-310711, JP A 2000-310712, JP A 2000-310713, JP A 2000-310714, JP A 2000-310715, JP A 2000-310716, JP A 2000-310717, JP A 2000-321560, JP A 2000-321567, JP A 2000-329936, JP A 2000-329941, JP A 2000-338309, JP A 2000-338329, JP A 2000-344905, JP A 2000-347016, JP A 2000-347017, JP A 2000-347026, JP A 2000-347027, JP A 2000-347029, JP A2000-347030, JP A 2000-347031, JP A 2000-347032, JP A 2000-347033, JP A 2000-347034, JP A 2000-347035, JP A 2000-347037, JP A 2000-347038, JP A 2000-86989, and JP A 2000-98392; and JP A 2001-4819, JP A 2001-4829, JP A 2001-4830, JP A 2001-4831, JP A 2001-4832, JP A 2001-4834, JP A 2001-4835, JP A 2001-4836, JP A 2001-4838, JP A 2001-4839, JP A 2001-100012, JP A 2001-108805, JP A 2001-108806, JP A 2001-133627, JP A 2001-133628, JP A 2001-142062, JP A 2001-142072, JP A 2001-174630, JP A 2001-174634, JP A 2001-174637, JP A 2001-179902, JP A 2001-183526, JP A 2001-183653, JP A 2001-188103, JP A 2001-188124, JP A 2001-188125, JP A 2001-188225, JP A 2001-188231, JP A 2001-194505, JP A 2001-228311, JP A 2001-228333, JP A 2001-242461, JP A 2001-242546, JP A 2001-247834, JP A 2001-26061, JP A 2001-264517, JP A 2001-272535, JP A 2001-278924, JP A 2001-2797, JP A 2001-287308, JP A 2001-305345, JP A 2001-311823, JP A 2001-311827, JP A 2001-350005, JP A 2001-356207, JP A 2001-356213, JP A 2001-42122, JP A 2001-42323, JP A 2001-42325, JP A 2001-51118, JP A 2001-51119, JP A 2001-51120, JP A 2001-51273, JP A 2001-51274, JP A 2001-55573, JP A 2001-66431, JP A 2001-66597, JP A 2001-74920, JP A 2001-81469, JP A 2001-83329, JP A 2001-83515, JP A 2001-91719, JP A 2002-162628, JP A 2002-169024, JP A 2002-189421, JP A 2002-201367, JP A 2002-20410, JP A 2002-258046, JP A 2002-275391, JP A 2002-294174, JP A 2002-311214, JP A 2002-311246, JP A 2002-328233, JP A 2002-338703, JP A 2002-363266, JP A 2002-365164, JP A 2002-370303, JP A 2002-40209, JP A 2002-48917, JP A 2002-6109, JP A 2002-71950, JP A 2002-82222, JP A 2002-90528, JP A 2003-105540, JP A 2003-114331, JP A 2003-131036, JP A 2003-139952, JP A 2003-153353, JP A 2003-172819, JP A 2003-35819, JP A 2003-43252, JP A 2003-50318, and JP A 2003-96066.

It is possible in the invention to form cellulose triacetate (TAC) film having high optical performance. The TAC film can be used as a base film for a polarizer protecting film or photosensitive material. Also, the TAC film can be used as an optical compensation film for use with a liquid crystal display panel in a television set to compensate for dependency upon the viewing angle. Also, the TAC film can be effectively used as an element which is both of a panel shaped polarizer and a protecting film simultaneously. A mode of the liquid crystal may be not only the TN mode but any one of the IPS mode, OCB mode and VA mode. Panel shaped polarizers can be constructed by use of a polarizer protecting film.

EXAMPLE 1

Experiments were conducted according to plural conditions including Experimental Conditions 1-6 and Comparable Conditions 1-4. Note that in Experimental Conditions 1-6 and Comparable Conditions 1-4, a state of drying a surface of the cast film immediately after casting was differently set, but remaining states were equally determined.

[Experiment]

The following is specifics of the experiment for the basis of the Experimental Conditions 1-6 and Comparable Conditions 1-4.

[Materials for Dope]

100 Parts by weight of particles of cellulose triacetate (substitution degree: 2.84, viscosity average degree of polymerization (DP): 306, water content: 0.2 wt. %, viscosity of 6 wt. % dichloromethane solution: 315 mPa.s, average particle diameter of powder particles: 1.5 mm, standard deviation of the particle diameter of powder particles: 0.5 mm);

320 parts by weight of dichloromethane, as a first solvent;
83 parts by weight of methanol, as a second solvent;
3 parts by weight of 1-butanol, as a third solvent;
7.6 parts by weight of triphenylphosphate as plasticizer A;
3.8 parts by weight of diphenylphosphate as plasticizer B;
0.7 part by weight of 2($2^1$-hydroxy-3',5'-di-tert-butylphenyl) benzotriazol, as UV absorber a;
0.3 part by weight of 2(2'-hydroxy-3',5'-di-tert-butylphenyl) 5-chlorobenzotriazol, as UV absorber b;
0.006 part by weight of mixture of citrate esters (mixture of citric acid, citrate monoethyl ester, citrate diethyl ester, and citrate triethyl ester);
0.05 part by weight of fine particles of silicon dioxide with a particle diameter of 15 nm, and Mohs hardness number of approx. 7.

[Cellulose Triacetate]

In the cellulose triacetate (TAC), an amount of the residual acetic acid was 0.1 wt. % or less. The TAC contained 58 ppm of Ca, 42 ppm of Mg, 0.5 ppm of Fe, 40 ppm of the free acid content of acetic acid, and 15 ppm of sulfur ion. The acetyl group in the TAC was an acetyl group of the substitution of the 6-position. In the TAC, an extracted amount of acetone was 8 wt. %. An amount of heat of crystallization was 6.4 J per gram. Raw material of cellulose for the TAC was fibrous material collected from cotton. The TAC herein will be referred to as cotton-derived TAC.

Exp. 1, Step 1: Preparation of Dope

The solvent tank or reservoir 11 of stainless steel was 4,000 liters large, and mixed delivered solvents by stirring to obtain mixed solvent. All of the solvent for use had the water content of 0.5 wt. % or less. Then the hopper 13 added TAC flake or powder gradually to the mixed solvent. The inside of the dissolving tank or reservoir 12 was stirred for a first dispersing step by use of the dissolver stirrer for 30 minutes at 5 m/sec as a peripheral speed of stirring. The temperature was 25 deg. C. at the start of the dispersion, and 48 deg. C. at the final step of the dispersion. A solution of additives from the additive tank 14 was added to the mixed solvent, to prepare the composition with a weight of 2,000 kg. After the dispersion, the stirring at the high speed was stopped. The anchor stirrer stirred further for 100 minutes at the peripheral speed of 0.5 m/sec, to obtain the swollen liquid 25 by swelling the TAC flake. Before the end of the swelling, the inside of the dissolving tank 12 was pressurized with gaseous nitrogen at 0.12 MPa. The oxygen density was 2 vol. % or less, the dissolving tank 12 being kept safe in view of an explosion-proof structure. A water content in the dope was 0.3 wt. %.

Exp. 1, Step 2: Dissolving and Filtration

The swollen liquid 25 was caused to flow in the heater 15, and was heated for complete dissolution. Time of applying the heat was 15 minutes. Then the swollen liquid 25 being dissolved was cooled by use of the temperature adjuster 16 down to 36 deg. C., and caused to pass the filtration chamber 17 having a filter with a nominal pore diameter of 8 microns, to obtain the dope 27 (unconcentrated dope).

Exp. 1, Step 3: Condensation, Filtration, Defoaming and Addition of Agents

The dope 22 before the concentration was flashed and condensed in the flash evaporator or flash device 30 conditioned at 80 deg. C. with an atmospheric pressure. The amount of the solid content of the flashed dope 22 was 21.8 wt. %. The solvent was liquefied, collected and separated by the solvent recovery device 32. The collected solvent was adjusted for preparation by the solvent refining machine 33 for reuse. After the refinement in the solvent refining machine 33, the solvent was sent to the solvent tank or reservoir 11. Distillation and dehydration were effected in the solvent recovery device 32 and the solvent refining machine 33. A flash tank in the flash evaporator or flash device 30 included an anchor stirrer (not shown) at the center. The anchor stirrer stirred the dope 22 for eliminating bubbles by rotations at the peripheral speed of 0.5 m/sec. Temperature of the dope 22 in the flash tank was 25 deg. C. Average time of stay in the flash tank of the dope 22 was 50 minutes.

Then bubbles were eliminated from the dope 27 by ultrasonic waves of low energy for defoaming. The pump 34 was used for the dope 27 to flow to the filtration chamber 31 in a pressurized state of 1.5 MPa. In the filtration chamber 31, the dope 27 was passed through a sintered fiber/metal filter with a nominal minimum pore diameter of 10 microns, and then through a sintered fiber filter with a nominal minimum pore diameter of 10 microns. The filtrated dope was conditioned at the temperature of 36 deg. C., and stored in the storing tank or reservoir 41 of stainless steel and 2,000 liters large. The storing tank 41 of FIG. 2 contained the dissolver stirrer 61 at its center, and stirred the dope 27 incessantly at a peripheral speed of 0.3 m/sec. As a result, no problem of corrosion or the like occurred in portions of device elements contacting the dope 27 in preparing the dope 27 from that before the concentration.

Also, a mixed solvent A was prepared by use of 86.5 parts by weight of dichloromethane, 13 parts by weight of acetone, and 0.5 part by weight of 1-butanol.

Exp. 1, Step 4: Storing Tank and Casting Die

The polymer film producing system 40 was used to form the polymer film 82. The dope 27 in the storing tank or reservoir 41 was dispensed by the gear pump 62 of high precision type to the filtration chamber 63. The gear pump 62 had a volume efficiency of 99.2%, and a ratio of fluctuation of 0.5% or less in the ejected amount. A pressure of ejection of the gear pump 62 was 1.5 MPa. The dope 27 passed in the filtration chamber 63 was sent to the casting die 42.

The dope 27 was cast by controlling its flow rate at the casting die 42 so as to obtain the polymer film 82 with a thickness in a dried state of 80 microns. Viscosity of the dope 27 was 20 Pa·s. A casting dope width of the casting die 42 was 1,700 mm. A casting speed was 20 m/min. A jacket (not shown) was provided in combination with the casting die 42, for maintaining the heat exchange medium at the temperature 36 deg. C. at an upstream end of the jacket, for setting the dope 27 at 36 deg. C.

The casting die 42 was preferably a coat hanger type. Thickness adjusting die bolts or heat bolts were arranged on the casting die 42 at a given pitch of 20 mm, and were preferably adapted to automatic adjustment of the thickness. The die bolts adjusted the thickness according to a flow amount of the gear pump 62. Also, an infrared thickness meter (not shown) was preferably installed in the polymer film producing system 40, for feedback control to adjust the thickness.

The decompressing chamber 68 was connected with the casting die 42 for negative pressure on the primary side. The decompressing chamber 68 was structured to create a difference in the pressure in a range of 1-5,000 Pa between two sides defined by the casting bead, and was adjustable according to the casting speed. The difference in pressure was determined so as to set a length of the casting bead at 20-50 mm. The decompressing chamber 68 decompressed and provided 150 Pa of a pressure difference by which the pressure on the rear of the bead was lower. Also, a mechanism of the decompressing chamber 68 was structured to set the chamber temperature higher than a condensation temperature of gaseous substances present around the position of casting. An edge suction device (not shown) was secured to the casting die 42, for eliminating irregularity in side edges of the casting bead. The suction device was adjustable in a range of 1-100 liters per minute, and were adjusted according to the example in a range of 30-40 liters per minute in operation. The jacket (not shown) was connected with the decompressing chamber 68, and was conditioned at 35 deg. C. by use of a heat exchange medium. The jacket kept the decompressing chamber 68 at a constant internal temperature.

Exp. 1, Step 5: Casting Die

Various parameters were changed to conduct the experiment in the drying step after forming the cast film of the dope on the casting support belt 46, the parameters including time T (sec) elapsed from the contact of the dope on the casting support belt 46 until flow of the dry gas 56 on to the cast film 69, flow rates V1 and V2 (m/sec) of the dry gas 56 and 58, and heights H1 and H2 (m) of the first and second flow paths 100 and 101. Results of the experiments will be described in the section of Evaluation of surface quality. The following is the condition of drying the cast film 69 further to the condition of the flow rates V1 and V2 (m/sec) and heights H1 and H2 (m). The temperature of the dry gas 56 and 58 was 60 deg. C. Gas density of the dry gas 56 and 58 was 16%. The temperature of the casting chamber 64 was kept at 35 deg. C. by the temperature adjuster 65. The labyrinth seal 54 regulated changes in the static pressure near to the casting die 42 at a level in a range from −1 to +1 Pa.

Exp. 1, Step 6: Support of Metal

Heat exchange medium of 5 deg. C. was introduced to a space in the support roller 45 on the side of the casting die 42. Heat exchange medium of 40 deg. C. was introduced to a space in the support roller 44 on the opposite side. Shortly before the casting, a surface temperature at the center of the casting support belt 46 was 15 deg. C. A difference between the end temperatures at the end of the casting support belt 46 was 6 deg. C. or less.

The casting support belt 46 was an endless belt of stainless steel, and was 2.1 meters wide and 70 meters long. A thickness of the casting support belt 46 was 1.5 mm. A surface roughness of the casting support belt 46 was 0.05 micron or less owing to polishing the belt surface. The material of the casting support belt 46 was SUS 316, and had sufficient strength and resistance to corrosion. Irregularity of the thickness of the casting support belt 46 was 0.5% or less. The casting support belt 46 was driven to turn by the support rollers 44 and 45. Tension exerted in the casting support belt 46 in rotation of the support rollers 44 and 45 for driving was controlled and regulated at a level of $1.5 \times 10^5$ N per sq. meter. A difference in the speed between the casting support belt 46 and the support rollers 44 and 45 was regulated at 0.01 m/min or less. A fluctuation in the speed of the casting support belt 46 was 0.5% or less. A zigzag movement of the casting support belt 46 in the belt width direction was limited to 1.5 mm or less during one turn of the casting support belt 46 by monitoring belt edges.

When an amount of the solvent in the cast film 69 became down to 50 wt. % according to the dry base, a self-supporting cast film 74 was stripped from the casting support belt 46 by a stripping roller 75 while the stripping roller 75 supports the self-supporting cast film 74. Tension of stripping was $1 \times 10^2$ N per sq. mm (namely $1 \times 10^8$ N per sq. meter). For the purpose of suppressing failure in the stripping, a stripping speed or stripping roller draw was adjusted in a range of 100.1-110% of a speed of the casting support belt 46. A film surface temperature of the self-supporting cast film 74 was measured, and found 15 deg. C. Solvent gas was obtained by the evaporation, and condensed by the condenser 66 conditioned at −10 deg. C., and collected by the solvent recovery device 67. Water in the collected solvent was conditioned with a water content of 0.5% or less. The dry gas after removal of the solvent was heated again, and reused as dry gas for blowing.

Exp. 1, Step 7: Tentering, Drying and Slitting

The self-supporting cast film 74 upon entry in the tentering type of drier 48 was fed in the drying zones in the drier 48 while retained by tenter clips on the web edges, and dried by dry gas. The tenter clips were cooled or thermally controlled by heat exchange medium of 20 deg. C. by flow through the conduits in those. A chain was used to drive the tenter clips. Fluctuation in the speed of the sprocket of the chain was 0.5% or less. There were three (3) zones defined inside the drier 48. Temperature of dry gas for those zones was conditioned at respectively 90, 110 and 120 deg. C. in the order of the stretching direction. An average drying speed in the drier 48 was 120 wt. %/min with reference to the dry base. The drying zones were conditioned so that the amount of the residual solvent of the polymer film became 7 wt. % at the downstream end of the drier 48. The polymer film 82 was also stretched in the web width direction in the drier 48 while transported. Tension in the web width direction was so set that a width of the self-supporting cast film 74 after the stretch was 103% as much as that of the self-supporting cast film 74 before the stretch. A stretching ratio from the stripping roller 75 to the drier 48, namely, tentering machine driving draw, was 102%.

In relation to the stretching ratio inside the tentering type of drier 48, a difference in the substantial stretching ratio at a portion 10 mm or more distant from the upstream tentering end was 10% or less. A difference in the stretching ratio between any two points being 20 mm distant from one another was 5% or less. A ratio of a size of the base end fixed by the tentering machine to a size being not fixed was 90%. The solvent gasified in the drier 48 was condensed at the temperature of −10 deg. C. into a liquid phase and collected. A condenser (not shown) was used, of which the exit or downstream end was conditioned at −8 deg. C. Furthermore, the solvent was regenerated for the reuse by adjusting the amount of its water content at 0.5 wt. % or less. Finally, the polymer film 82 was fed forwards from the drier 48.

Web edges of the polymer film 82 were slitted by the web edge slitter 50 within 30 seconds after moving from a downstream end of the tentering type of drier 48. An NT cutter in the web edge slitter 50 slitted the web edges being 50 mm wide. A cutter blower (not shown) moved the obtained web edge portions by blowing into the film crusher or grinder 90, which ground the web edge portions into chips or particles with an average area of 80 sq. mm. The chips were utilized as raw material for regeneration in producing the dope together with the TAC flake. In the dry atmosphere of the drier 48, density of the oxygen was kept at 5 vol. %. To keep the density of the oxygen, gaseous nitrogen was used for substitution in air. There was a pre-drying chamber (not shown), which heated the polymer film 82 in a preliminary manner with dry gas of 100 deg. C. before drying in the drier 51.

Exp. 1, Step 8: Posterior Drying and Electrostatic Elimination

The drier 51 dried the polymer film 82 at a high temperature. Four zones were defined by splitting inside the drier 51. Blowers (not shown) or fans caused dry gas to blow the polymer film 82 at 120, 130, 130 and 130 deg. C. associated with respectively the zones in a downstream sequence. Tension applied to the polymer film 82 by the transport with the rollers 91 was 100 N/m. The polymer film 82 was dried for approximately 10 minutes until the amount of the residual solvent came down to 0.3 wt. %. Wrap angles of the rollers 91 were set 90 and 180 degrees. The rollers 91 were formed from aluminum or carbon steel, and coated with a hard chrome plating. A plurality of the rollers 91 included some prepared in a smoothly curved form, and others prepared in a matted form obtained by finish of blast. A range of film shakes due to rotations of the rollers 91 was 50 microns or less. Flexure of the rollers 91 at the tension of 100 N/m was regulated at an amount of 0.5 mm or less.

The solvent gas contained in the dry gas was collectively removed by adsorption of the adsorption solvent recovery device 92. An agent for adsorption was activated carbon. Desorption after the absorption was made by use of dry nitrogen. The collected solvent was conditioned with water of 0.3 wt. % of water content, and was reused for dope regeneration. Various gaseous substances were contained in the dry gas, including the gaseous plasticizer, gaseous UV absorbers, and other substances with a high boiling point in addition to the solvent gas. Those gaseous substances were removed by cool collecting operation of a cooler and a pre-adsorber, and were reused in a circulated manner. The adsorption and desorption were conditioned so as to set the content of volatile organic compounds (VOC) equal to or less than 10 ppm in the waste gas in the outdoor environment. Note that approximately 90 wt. % of solvent was collected according to the condensing method. The remainder of the solvent was collected by the adsorption method.

A first humidity conditioning chamber (not shown) was supplied with the polymer film 82 after being dried. There was a transition section between the drier 51 and the first chamber. Dry gas of 110 deg. C. was caused to flow through the transition section. In the first chamber, air of 50 deg. C. and having a dew point of 20 deg. C. was caused to blow the polymer film 82. Then the polymer film 82 was transported into a second humidity conditioning chamber (not shown) for preventing occurrence of film curls. In the second chamber, air at temperature of 90 deg. C. with humidity of 70% RH was caused to blow the polymer film 82 directly.

Exp. 1, Step 9: Knurling and Winding

After conditioning the humidity of the polymer film 82, the polymer film 82 was cooled in the cooler 52 at 30 deg. C. or lower, and subjected to slitting of web edge portions in a web edge slitter (not shown). While the polymer film 82 was transported, the knurling roller 94 knurled each of the web edge portions of the polymer film 82. The knurling was edge embossing at a width of 10 mm. A pressure for knurling was conditioned so as to obtain an average maximum height of the knurled pattern 12 microns higher than an average thickness of the polymer film.

Then the polymer film 82 was transported into the winder 53. The winder 53 was kept conditioned at 28 deg. C., and 70% RH of humidity. An ion gas flow static eliminator (not shown) was installed so as to set potential of the electrified polymer film 82 in a range from −1.5 kV to +1.5 kV. The polymer film 82 being obtained was 80 microns thick, and 1,900 mm wide. A diameter of the winding roller 95 was 169 mm. Tension was sequentially controlled, and set at 300 N per meter at the initial step of the winding, and set at 200 N per meter at the end of the winding. The total length of the polymer film was 3,940 meters. With reference to the winding roller 95 of which a width of oscillation of the polymer film 82 was from −5 mm to +5 mm, a period of a fluctuation in the winding of the polymer film 82 was 400 meters. A pressure applied by the press roller 96 to the winding roller 95 was determined 50 N per meter. The polymer film 82 while being wound had temperature of 25 deg. C., contained 1.4 wt. % of water, and contained 0.3 wt. % of residual solvent. An average rate or speed of drying in the whole process was 20 wt. % per minute according to the dry base of solvent. As a result of observation, no wrinkle or looseness of the windings were found to occur. No offsetting of the windings occurred in the test of shock at 10 g (10 times normal gravity). Also, appearance of the roll of the polymer film was found agreeable.

Preservation was tested. A roll (not shown) of the polymer film 82 was preserved in a rack at 25 deg. C. with 55% RH for one (1) month. The polymer film 82 after this was observed in the same manner as described above. As a result, no change was found. No adhesions within the roll were found. No failure of stripping of the cast film 69 as a residue of the dope was found on the casting support belt 46 after casting of the polymer film 82.

[Evaluation of Film Surface]

In the Experimental Conditions 1-6 and Comparable Conditions 1-4, the values of the time T (sec), the flow rates V1 and V2 (m/sec) of the dry gas 56 and 58, and the heights H1 (=H3) and H2 (m) were changed in the manners of the following, to evaluate the surface quality of the polymer film 82 by observing the polymer film 82 with human eyes.

[Experimental Condition 1]

The time T was 3 seconds. The flow rate V1 was 15 m/sec. The height H1 was 0.02 m. The flow rate V2 was 12 m/sec. The height H2 was 0.10 m. Thus, $\alpha 1 = V1/(H1^{1/2})$ was 106.1. $\alpha 2 = V2/(H2^{1/2})$ was 37.9.

[Experimental Condition 2]

The time T was 5 seconds. The flow rate V1 was 7 m/sec. The height H1 was 0.02 m. The flow rate V2 was 12 m/sec. The height H2 was 0.20 m. Thus, $\alpha 1 = V1/(H1^{1/2})$ was 49.5. $\alpha 2 = V2/(H2^{1/2})$ was 26.8.

[Experimental Condition 3]

The time T was 5 seconds. The flow rate V1 was 12 m/sec. The height H1 was 0.05 m. The flow rate V2 was 7 m/sec. The height H2 was 0.10 m. Thus, $\alpha 1 = V1/(H1^{1/2})$ was 53.7. $\alpha 2 = V2/(H2^{1/2})$ was 22.1.

[Experimental Condition 4]

The time T was 3 seconds. The flow rate V1 was 7 m/sec. The height H1 was 0.05 m. The flow rate V2 was 12 m/sec. The height H2 was 0.20 m. Thus, $\alpha 1=V1/(H1^{1/2})$ was 31.3. $\alpha 2=V2/(H2^{1/2})$ was 26.8.

[Experimental Condition 5]

The time T was 5 seconds. The flow rate V1 was 12 m/sec. The height H1 was 0.01 m. The flow rate V2 was 9 m/sec. The height. H2 was 0.20 m. Thus, $\alpha 1=V1/(H1^{1/2})$ was 37.9. $\alpha 2=V2/(H2^{1/2})$ was 20.1.

[Experimental Condition 6]

The time T was 10 seconds. The flow rate V1 was 6.5 m/sec. The height H1 was 0.01 m. The flow rate V2 was 12 m/sec. The height H2 was 0.20 m. Thus, $\alpha 1=V1/(H1^{1/2})$ was 20.6. $\alpha 2=V2/(H2^{1/2})$ was 26.8.

[Comparable Condition 1]

The time T was 30 seconds. The flow rate V1 was 15 m/sec. The height H1 was 0.02 m. The flow rate V2 was 12 m/sec. The height H2 was 0.10 m. Thus, $\alpha 1=V1/(H1^{1/2})$ was 106.1. $\alpha 2=V2/(H2^{1/2})$ was 37.9.

[Comparable Condition 2]

The time T was 5 seconds. The flow rate V1 was 30 m/sec. The height H1 was 0.02 m. The flow rate V2 was 12 m/sec. The height H2 was 0.02 m. Thus, $\alpha 1=V1/(H1^{1/2})$ was 212.1. $\alpha 2=V2/(H2^{1/2})$ was 26.8.

[Comparable Condition 3]

The time T was 3 seconds. The flow rate V1 was 3 m/sec. The height H1 was 0.02 m. The flow rate V2 was 7 m/sec. The height H2 was 0.50 m. Thus, $\alpha 1=V1/(H1^{1/2})$ was 6.7. $\alpha 2=V2/(H2^{1/2})$ was 9.9.

[Comparable Condition 4]

The time T was 10 seconds. The flow rate V1 was 12 m/sec. The height H1 was 0.05 m. The flow rate V2 was 2 m/sec. The height H2 was 0.30 m. Thus, $\alpha 1=V1/(H1^{1/2})$ was 53.7. $\alpha 2=V2/(H2^{1/2})$ was 3.7.

TABLE 1 indicates evaluation of surface quality of the polymer film 82 according to various conditions.

TABLE 1

| Parameters | Experimental condition 1 | Experimental condition 2 | Experimental condition 3 | Experimental condition 4 | Experimental condition 5 |
|---|---|---|---|---|---|
| T (sec) | 3 | 5 | 5 | 3 | 5 |
| V1 (m/sec) | 15 | 7 | 12 | 7 | 12 |
| H1 (m) | 0.02 | 0.02 | 0.05 | 0.05 | 0.10 |
| α1 | 106.1 | 49.5 | 53.7 | 31.3 | 37.9 |
| V2 (m/sec) | 12 | 12 | 7 | 12 | 9 |
| H2 (m) | 0.10 | 0.20 | 0.10 | 0.20 | 0.20 |
| α2 | 37.9 | 26.8 | 22.1 | 26.8 | 20.1 |
| Evaluation | A | A | A | A | B |

| Parameters | Experimental condition 6 | Comparable condition 1 | Comparable condition 2 | Comparable condition 3 | Comparable condition 4 |
|---|---|---|---|---|---|
| T (sec) | 10 | 30 | 5 | 3 | 10 |
| V1 (m/sec) | 6.5 | 15 | 30 | 3 | 12 |
| H1 (m) | 0.10 | 0.02 | 0.02 | 0.20 | 0.05 |
| α1 | 20.6 | 106.1 | 212.1 | 6.7 | 53.7 |
| V2 (m/sec) | 12 | 12 | 12 | 7 | 2 |
| H2 (m) | 0.20 | 0.10 | 0.20 | 0.50 | 0.30 |
| α2 | 26.8 | 37.9 | 26.8 | 9.9 | 3.7 |
| Evaluation | C | C | F | F | F |

The following is a list of grades indicated in the table.

A: Smooth film surface.

B: Smooth film surface, but with very slight patterned projections or recesses.

C: Film surface with slight patterned projections or recesses, but usable for some use as optical film.

F: Failing and useless as optical film due to patterned projections or recesses on the film surface.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A polymer film producing method in which dope containing polymer and solvent is cast on a moving support to form a cast film, said cast film is stripped from said support to obtain a polymer film containing said solvent, and said polymer film is dried, said polymer film producing method comprising steps of:

causing a first dry gas to flow toward said cast film through a first gas outlet positioned to face said support;

causing a second dry gas to flow through a second gas outlet such that the path of a flow of said second dry gas is substantially parallel to a moving direction of said support in the vicinity of the second gas outlet and the flow of the second gas out of the second gas outlet is positioned higher than a height of a first flow path of a flow of said first dry gas and a height of said first gas outlet relative to said support; and wherein a height H1 of said first flow path relative to said support is equal to or more than 20 mm and equal to or less than 300 mm.

2. A polymer film producing method as defined in claim 1, wherein in said flow of said first dry gas, an outer layer portion of said cast film is dried, to form a surface layer on a surface of said cast film with a higher surface tension than an undried portion; and in said flow of said second dry gas, drying of said cast film is promoted.

3. A polymer film producing method as defined in claim 2, wherein a second flow path is disposed to extend downstream from said first flow path with respect to said moving direction, for flowing of said second dry gas on said cast film;

a length La of said first flow path is smaller than a length Lb of said second flow path.

4. A polymer film producing method as defined in claim 2, wherein time of lapse after a start of contact of said dope on said support until supply of said first dry gas to said cast film is 15 seconds or less.

5. A polymer film producing method as defined in claim 4, wherein upon or before lapse of 15 seconds after a start of forming said cast film, said first dry gas starts to flow and is supplied to said cast film for at least three seconds.

6. A polymer film producing method as defined in claim 4, wherein temperature of said first and second dry gases is equal to or more than 40 deg. C. and equal to or less than 150 deg. C.

7. A polymer film producing method in which dope containing polymer and solvent is cast on a moving support to form a cast film, said cast film is stripped from said support to obtain a polymer film containing said solvent, and said polymer film is dried, said polymer film producing method comprising steps of:

causing a first dry gas to flow toward said cast film through a first gas outlet positioned to face said support;

causing a second dry gas to flow through a second gas outlet such that the path of a flow of said second dry gas is substantially parallel to a moving direction of said support in the vicinity of the second gas outlet and the flow of the second gas out of the second gas outlet is positioned higher than a height of a first flow path of a flow of said first dry gas and a height of said first gas outlet relative to said support;

wherein each of $\alpha 1$ and $\alpha 2$ is equal to or more than 20 and equal to or less than 150, where $\alpha 1$ and $\alpha 2$ satisfy conditions of:

$\alpha 1 = V1/(H1^{1/2})$ $\alpha 2 = V2/(H2^{1/2})$ where V1 is a flow rate (m/sec) of said first dry gas;

V2 is a flow rate (m/sec) of said second dry gas;

H1 is a height of said first flow path relative to said support;

H2 is a height of said second flow path with reference to said support.

* * * * *